US006961855B1

(12) United States Patent
Rich et al.

(10) Patent No.: US 6,961,855 B1
(45) Date of Patent: Nov. 1, 2005

(54) NOTIFICATION OF MODIFICATIONS TO A TRUSTED COMPUTING BASE

(75) Inventors: Bruce Arland Rich, Round Rock, TX (US); Theodore Jack London Shrader, Austin, TX (US); Donna Skibbie, Round Rock, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,854

(22) Filed: Dec. 16, 1999

(51) Int. Cl.[7] .................... G06F 11/30; G06F 12/14; H04L 9/00; H04L 9/32
(52) U.S. Cl. ................. 713/200; 713/201; 713/187
(58) Field of Search ................. 713/200, 201, 713/187

(56) References Cited

U.S. PATENT DOCUMENTS

| 5,680,458 A | 10/1997 | Spelman et al. ............ 380/21 |
| 5,862,325 A | 1/1999 | Reed et al. ............ 395/200.31 |
| 5,958,051 A * | 9/1999 | Renaud et al. ............ 713/200 |
| 6,279,112 B1 * | 8/2001 | O'Toole et al. ............ 713/201 |

OTHER PUBLICATIONS

IBMC, "Provision of secure environment for evaluating and executing Java applications . . . ", Oct. 10, 1998.*

* cited by examiner

*Primary Examiner*—Gilberto Barron
*Assistant Examiner*—Grigory Gurshman
(74) *Attorney, Agent, or Firm*—Duke W. Yee; Stephen J. Walder, Jr.; Jeffrey S. LaBaw

(57) ABSTRACT

A mechanism that allows enterprise authorities to be informed when security-sensitive decisions or actions have been or are attempting to be made by users of untrusted code executing in the trusted computing base. The mechanism may be implemented as an abstract class that is part of the trusted computing base. The class provides a framework abstract enough to permit multiple possible notifications (e.g., providing an e-mail to a system operator, sending an Simple Network Management Protocol (SNMP) alert, making an entry in an online database, or the like) in the event that a given action is taken by a user of untrusted code. The abstract class may provide a default notification, or the class may be extended to enable an authority to provide its own set of customized notifications.

23 Claims, 2 Drawing Sheets

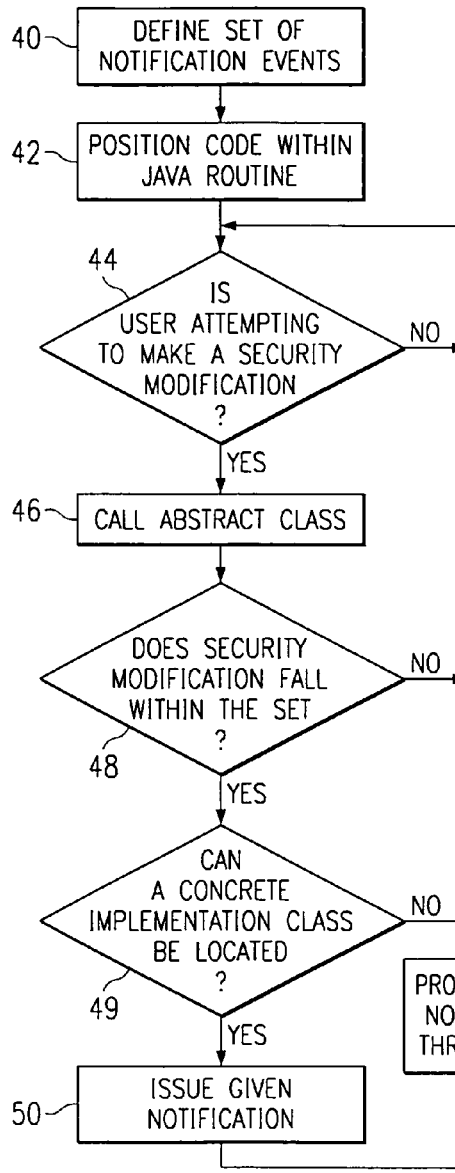
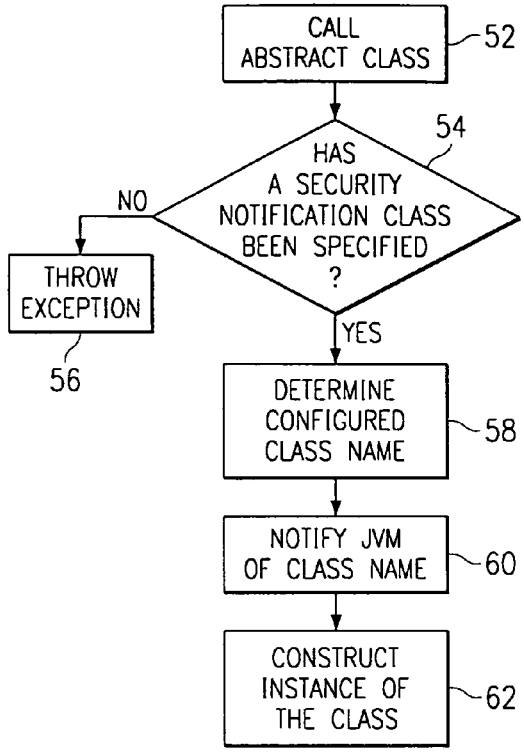
FIG. 3
FIG. 4
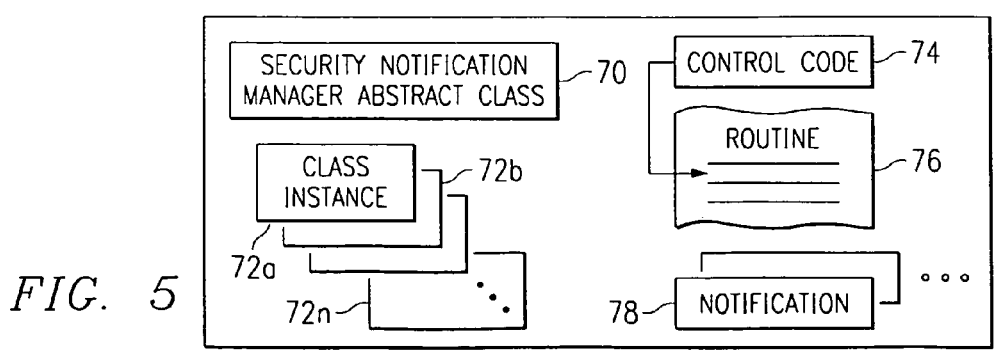
FIG. 5

NOTIFICATION OF MODIFICATIONS TO A TRUSTED COMPUTING BASE

BACKGROUND OF THE INVENTION

1. Technical Field

The present invention relates generally to managing a trusted computing base in an enterprise computing environment wherein individual users execute programs written in untrusted code (e.g., Java) that invoke security-sensitive decisions or actions.

2. Description of the Related Art

Java, originally developed by Sun Microsystems, is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer.

Initially, programs written in Java found widespread use in Internet applications. As a result of this browser-centric focus, security concerns raised by Java primarily involved the security of the Java sandbox and the origin of the executable code (namely, the class). More recently, however, Java is beginning to move out of the browser and into widespread use in enterprise environments. This migration, however, has created new security concerns.

Browsers and Java were originally developed with a single user isolated from the rest of the world view. This isolated view, however, creates potential security problems in the context of an enterprise environment running a trusted computing base. This is because Java users can now make decisions about the appropriateness of running applets and applications that wish to modify local resources. Thus, for example, consider an applet that desires to run with privileges outside the Java sandbox. Normally, the applet must be signed. If that signature fails verification (indicating that either the applet source file has become corrupted, or that deliberate tampering has occurred), the browser user may simply ignore the failure to verify. As a result, the applet would run as untrusted and the enterprise would not know about the corruption or the potential attack. Another example would be a user running an applet that attempts to add or modify a certificate or key in a certificate database within the trusted computing installation.

It would be desirable to be able to provide the trusted computing base with a notification in the event that a user running untrusted code undertakes a security-sensitive decision or operation.

BRIEF SUMMARY OF THE INVENTION

The present invention is a mechanism that allows enterprise authorities to be informed when security- or integrity-sensitive decisions or actions have been or are attempting to be made by users of untrusted code executing in the trusted computing base. By providing such notification, the authorities in the enterprise may potentially intervene in decisions or actions made by such users before they impact the enterprise.

The mechanism may be implemented as an abstract class that is part of the trusted computing base. The abstract class is a framework for providing a given notification (e.g., providing an e-mail to a system operator, sending an Simple Network Management Protocol (SNMP) alert, making an entry in an online database, or the like) in the event that a given action is taken by a user of untrusted code. The abstract class may provide a default notification, or the abstract class may be extended to enable an authority to provide its own set of customized notifications. The framework thus enables multiple implementations to work underneath it, and users (namely, security-aware applications) do not need to know the details of each implementation.

According to an illustrative embodiment, a method of notifying a central authority of changes to a trusted computing installation begins by determining that a user has made a security modification to a portion of the trusted computing installation under user control. Then, a determination is made whether the security modification falls within a group of notification events identified. If so, a notification is sent to the central authority of the security modification.

A technical advantage of the present invention is to enable an administrator or other central authority to insert alerts at various points in Java where security relevant decisions are being made. Examples of some of these decision points include a failed applet signature verification, an attempted addition of a certificate in a certificate database, an attempted modification of a key in the database, or the like.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a flowchart illustrating the basic operation of the security notification mechanism and service of the present invention;

FIG. 4 is a flowchart illustrating the operation of the security manager abstract class; and FIG. 5 is a simplified representation of the groups of classes that comprise an illustrative embodiment of the present invention;

DETAILED DESCRIPTION OF THE PREFERRED EMBODIMENT

Figure 1:
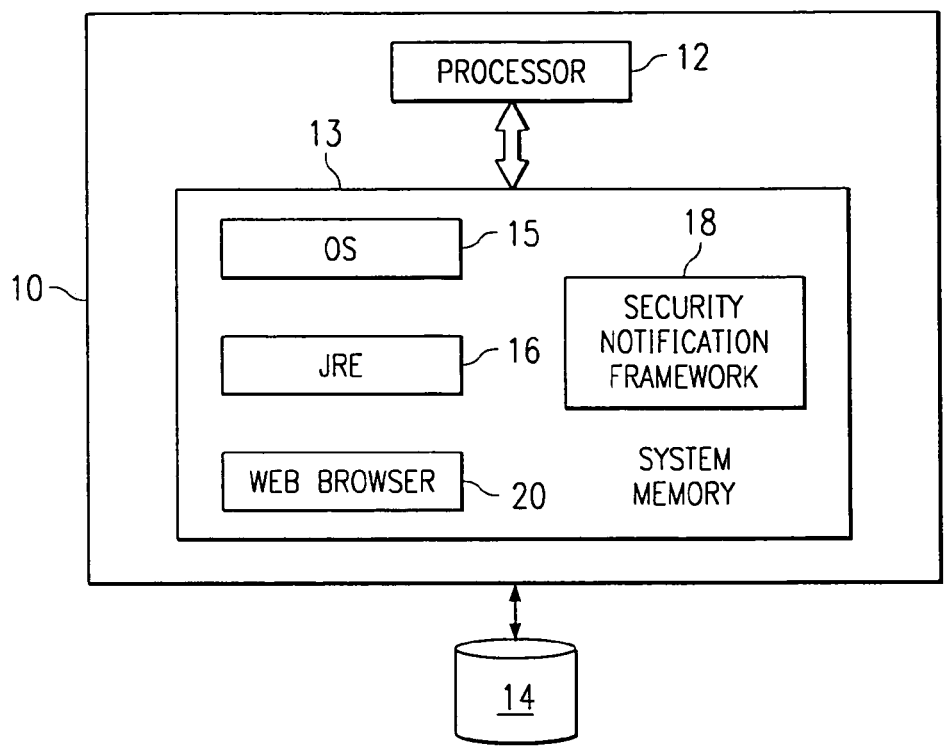
FIG. 1 illustrates a computer in which the inventive architecture is supported.

As will be described below, one or more of the processes that comprise the present invention may be carried out on a computer, or on one or more computers connected via a computer network. Referring to FIG. 1, a computer for use in implementing the present invention is shown. The computer 10 has a processor 12, system memory 13, permanent memory 14, an operating system 15, a Java Runtime Environment ("JRE") 16, and an optional browser 20 that supports applets. A representative computer is any personal computer or workstation platform that is Intel-, PowerPC®- or RISC®-based, and that includes an operating system such as Microsoft Windows NT with Service Pack 4 installed, JRE Java 2, and a browser that supports applets, such as Netscape Communicator 4.06. This configuration, of course, is not to be taken to limit the invention.

Figure 2:
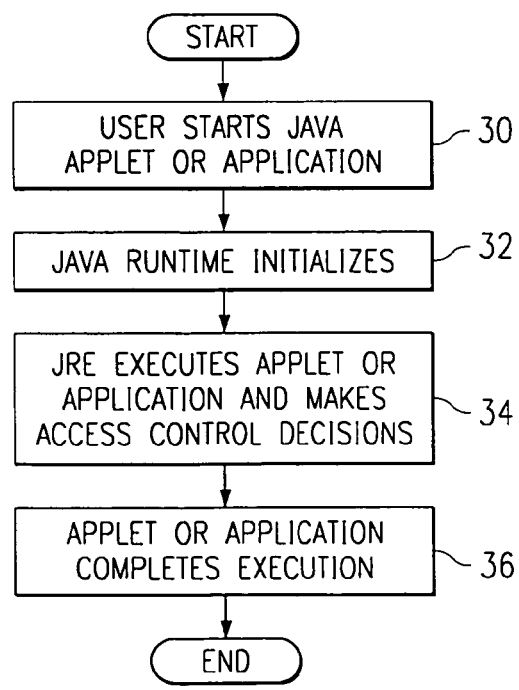
FIG. 2 is a high level flowchart illustrating the operating environment in which the present invention is implemented.

FIG. 2 is a high level flowchart illustrating the operating environment in which the present invention is implemented. By way of brief background, the inventive class support preferably is built into a Java Virtual Machine (JVM) by modifying and enhancing core JRE classes, as will be described in more detail below. Alternatively, the class support may be provided as standalone code. These changes make the support provided by the class module 18 available to both Java applets running in browsers and, optionally, Java applications running in a Java interpreter.

As is well-known, an applet is typically served to a client machine when the user downloads a web page that includes an applet tag and that tag is parsed by a web browser. After the applet is downloaded from a server to the client, the applet can be initialized and run. As seen in the flowchart, the routine begins at step 30 when the browser starts a Java program, e.g., an applet. At step 32, the Java Runtime Environment (JRE) initializes. In particular, when a JVM is created (as a result of the Web browser loading a Java applet), the JRE is initialized.

In Java 2, one aspect of initialization is creation of the JVM Policy object. Creation of the Policy object is implementation-dependent. The Policy object is typically created through the PolicyFile class. On initialization, PolicyFile reads permission information stored in static policy files in the system's filesystem. Standard Java implementations support policy files containing permissions to be granted to requesters.

The following are some representative examples of the types of permissions that can be granted to requesting programs and individuals:

```
// Standard extensions get all permissions by default
grant codeBase "file:${java.home}/lib/ext/-" {
    permission java.security.AllPermission;
};
// default permissions granted to all domains
grant {
    permission java.lang.RuntimePermission "stopThread";
    // allows anyone to listen on un-privileged ports
    permission java.net.SocketPermission
"localhost:1024-", "listen";
    // "standard" properties that can be read by anyone
    permission java.util.PropertyPermission
"java.version", "read";
};
grant codeBase
"http://gordo.austin.ibm.com/devt/bridge5/test.jar",
signedBy "moe,curly" {
    permission java.io.FilePermission
"c:/foobar.txt","read";
};
grant codeBase
"http://guano.austin.ibm.com/devt/bridge7/build/win32/classes/-" {
    permission java.net.SocketPermission "*:*",
"connect,resolve";
};
```

An operation tied closely to the Policy initialization is the association of a ProtectionDomain to each class that is loaded. A ProtectionDomain is a class that couples a CodeSource with a set of permissions granted to that CodeSource. Each class maps to a single CodeSource; thus, a CodeSource may be thought of as a class's identity. A ProtectionDomain maps a class to its permissions.

Returning to FIG. 2, the routine continues at step 34 with the execution of the Java applet. In the course of applet execution, it is likely that protected resources will be required (for example, a file may need to be read or written, or a socket may need to be opened). Each time a protected resource is accessed, an access control check is performed. The access control check proceeds as follows. The Java virtual machine maintains a callstack of current classes for each Thread in the virtual machine. For each class in each stack, the JVM knows whether it was loaded by the primordial (built into the JVM for trusted system classes) loader, or some other classloader. For each class in the stack that was loaded by a classloader other than the primordial loader, the JVM can find from whence the class was loaded (the class's "codebase"). On a security check, the JVM makes sure that for the current Thread, each codebase represented in the classes in that Thread's stack must have been granted a Permission that "implies" the Permission that is being checked. Note that if a class does not have a codebase, that is because it is a trusted system class loaded by the primordial loader, and therefore implicitly has all permissions.

If any class in the current Thread's call stack does not have permission to perform the requested operation, a java.security.AccessControlException is constructed and thrown. This exception is an object that contains some message text (like "access denied" and then the permission that was being requested, like "java.io.FilePermission c:\\foo.txt, read"), as well as a print of the current call stack. The effect of throwing this exception inside the JVM is to cause the JVM to search back through the call stack for a class that had set an "exception handler," which is simply done in Java by enclosing Java statements in a "try-catch" block, as illustrated below.

```
try { // set up an "exception handler"
    int x = new
java.io.FileInputStream("c:\\foo.txt").read( ); // try to
read the file
    }
    catch (java.io.IOException ioe) { // got an I/O
exception
        // do whatever we want, if anything
        // unless we throw an exception here, the
exception has now been "handled"
    }
    catch (java.security.AccessControlException ace) {
// got a security exception
        // do whatever we want, if anything
        // unless we throw an exception here, the
exception has now been "handled"
    }
    // if some other exception was thrown while
processing the read( ) of that file, this class did not
"handle" it
    . . .
```

If no exception handler had been set by any class on the stack, the current Java program is terminated. If an exception handler had been set, then the JVM trims the stack of any classes that had not set an exception handler (after the one class that had set an exception handler), and gives the exception handler control. If the exception handler does not in fact handle the exception, then the JVM resumes its search for a handler as outlined above. If the exception handler does handle the exception, then program execution now continues in the class that contained the exception-handling code. Note that since the exception has now been handled, it is as if it had never happened. The class that handled the exception can continue to try to do things that it does not have permission to do.

Returning back to FIG. 2, at step 36, the Java applet completes its execution. At this point, the JVM terminates. This completes the processing.

According to the present invention, a mechanism is provided to notify a central authority when security-relevant decisions or actions are being or have been made by untrusted code executing in a trusted computing installation. This mechanism preferably is implemented as an abstract class, referred to herein as secNanny, that provides a pluggable security notification framework. The abstract class is made available to the trusted computing base, and it may also be extended to enable multiple underlying security notification implementations. In this way, a central authority may customize the type of events that may trigger the notification or provide for custom notifications. This concrete implementation class may be specified in the java.security configuration file.

FIG. 3 is a high level flowchart illustrating the basic operation of the inventive mechanism. The routine begins at step 40 by defining a set of one or more notification events of interest. As will be described in more detail below, this step may be accomplished by extending the abstract class with a given instantiation of that class (e.g., secNannyImpl.java). At step 42, appropriate code (e.g., test.java) is placed within the Java routine of interest at the point where a given security-sensitive decision may be made. The routine then continues at step 44 to test whether a user (e.g., at a client machine) has made or is attempting to make a security modification to a portion of the trusted computing installation under his or her control. More specifically, step 44 tests whether the decision point in the Java routine of interest has been reached. If not, the routine cycles. If, however, the outcome of the test at step 44 is positive, the routine continues at step 46 to call the abstract class. At step 48, a test is made to determine whether the security modification falls within the set of one or more notification events. This step may be accomplished, for example, by examining the message text in a static method of the abstract class (i.e. SecNanny.java).

If the outcome of the test at step 48 is negative, the routine returns to step 44. If, however, the outcome of the test at step 48 is positive, the routine continues to step 49 to determine whether a concrete implementation of the security notification class can be instantiated. If the outcome of the test at step 49 is negative, either an exception could be thrown or a default notification performed and the routine returns to step 44. If, however, the outcome of the test at step 49 is positive, the routine continues at step 50 with a concrete implementation of the abstract class (i.e. SecNannyImpl.java) issuing a given notification to the central authority. The type of notice is preferably defined in a concrete implementation of the abstract class and may include, for example, an e-mail to a system administrator, an SNMP alert, a command to an online database logger, or the like. This completes the processing.

To provide a more concrete example, assume that a Java applet requests that the applet run with higher-than-normal privileges. Normally, such a request would require that a signature for the applet be verified. In this example, it is assumed that the central authority desires to receive a notification of a failed signature verification. In such case, the appropriate control code (to call the abstract class) would be placed in the applet signature verification code routine (i.e. SignatureFileVerifier) where required. When that code is triggered, the abstract class is called that tests whether or not a failed signature verification has occurred and that determines whether a concrete implementation of the security notification class can be instantiated. If so, the particular notice (as defined, for example, in a concrete implementation of the abstract class) is then sent to the central authority. The applet may be executed as "untrusted" or some other control action may be taken.

Another concrete example of the inventive notification mechanism is the providing of a notification when the security modification is the addition or modification of a certificate or key in a certificate database within the trusted computing installation. In this example, the appropriate control code (to call the abstract class) is placed in the certificate modification/addition routine. When that code is triggered, the abstract class is called, which tests whether or not the user is attempting to add or modify a given certificate or key and which determines whether a concrete implementation of the security notification class can be instantiated. If so, a given notice is sent to the central authority.

In the above-described examples, a concrete class is instantiated with a class instance that performs the notice operation. This is not a requirement of the present invention, however. Alternatively, or in addition to the use of a given a concrete implementation of the abstract class, the abstract class may have a default operation that provides the required notice. The motivation for using an abstract class as the interface for the security notification framework is so that various implementations can be substituted at run-time without the calling code either knowing or caring.

The following is illustrative code for the security notification manager abstract class:

```
SECNANNY.JAVA
public abstract class SecNanny {
    private static SecNanny secNanny = null;
    private static ClassLoader sysClassLoader = null;
    public static void notify(String msgText) throws
ProviderNotFoundException {
        if (secNanny == null) {
            secNanny = getSecNanny( );
            if (secNanny == null)
                throw new ProviderNotFoundException ("No
Security Nanny installed");
        }
        secNanny.notifyAll (msgText);
    protected abstract void notifyAll(String msgText);
    private static SecNanny getSecNanny( ) {
        String secNannyProviderName = null;
        SecNanny useMe = null;
        if (secNannyProviderName == null) { // We haven't
located the Security Nanny for the system
            secNannyProviderName =
(String)java.security.AccessController.doPrivileged(
                new
java.security.PrivilegedAction( ) {
                    public Object run( ) {
                        return
System.getProperty("security.nanny");
                    }
                });
            if (secNannyProviderName != null) {
                if (sysClassLoader == null)
                    sysClassLoader =
(ClassLoader)java.security.AccessController.doPrivileged(
                        new
java.security.PrivilegedAction( ) {
                            public Object run( ) {
                                return
ClassLoader.getSystemClassLoader( );
                            }
                        });
```

-continued

```
        try {
            useMe = (SecNanny)Class.forName
                (secNannyProviderName,
                true,
    sysClassLoader).newInstance( );
            } catch (Exception e) {
                // leave useMe as null
            }
        }
        return useMe;
    }
}
```

As can be seen, the secnanny abstract class is a generic framework that can be extended to provide different implementations for the inventive notification service. An example of one such instantiation, called secNannyImpl.java, is set forth below. This security notification manager, as an abstract class, cannot be instantiated per se, however, most of the implementation of the invention is provided in this class to provide the pluggable framework.

FIG. 4 is a high level flowchart illustrating the operation of the security notification manager abstract class, namely, the secNanny code set forth above. The routine begins at step 52 when the abstract class is called. As noted above, typically the abstract class is called by control code (e.g., test.java, as identified below) that is positioned within a given Java routine. In particular, the control code is positioned at a relevant decision point that implicates the security or integrity of the trusted computing installation. At step 54, a test is made to determine whether a security notification manager has been specified. If a security notification manager is not specified and a user or the installation attempts to call it, a general runtime exception may be thrown. Thus, if the outcome of the test at step 54 is positive, the routine continues. If, however, the outcome of the test at step 54 is negative, the routine branches to step 56 to throw a general runtime exception. The code for accomplishing this step is illustrated below, as providerNotFoundException.java.

PROVIDERNOTFOUNDEXCEPTION.JAVA

```
public class ProviderNotFoundException extends java-
    .lang.SecurityException {
    public ProviderNotFoundException(String msgText) {
        super(msgText);
    }
}
```

At step 58, a first method in the class determines the configured class name for the security notification manager. Given this name, the routine then continues at step 60 to notify the Java Virtual Machine (JVM) of the class name. At step 62, an instance of the class in then constructed. The particular instance may be identified based on a name that is passed in from a getProperty method and, as noted above, may be a user-defined or installation-defined class that is used to perform the security event notification. This completes the processing.

The following code, called secNannyImpl.java, is a representative implementation of the security notification manager abstract class. In this example, the notification is simply a text message printed out to a user's screen, and this notification is implemented by the System.out.println( ) method to print out the message text (msgText) identified in the method. In a preferred embodiment, an SNMP alert, an e-mail, an event logger, or the like, is used to record the actual event.

ECNANNYIMPL.JAVA

```
public class SecNannyImpl extends SecNanny {
    public SecNannyImpl( ) {
    }
    protected void notifyAll(String msgText) {
        System.out.println(msgText);
    }
}
```

The control code in this example is referred to herein as test.java. As described above, this is the code that is positioned within the Java routine of interest. In this example, the actual notification (e.g., "Hey, something's wrong") is the value of the secNanny.notify( ) method. A representation control code snippet is set forth below:

TEST.JAVA

```
import SecNanny;
public class test {
    public static void main(String argv[ ]) {
        try {
            SecNanny.notify("Hey, something's wrong!");
        }
        catch (ProviderNotFoundException pnfe) {
            pnfe.printstackTrace( );
        }
    }
}
```

FIG. 5 is a simplified illustration of the inventive mechanism. The mechanism comprises the security notification manager abstract class 70, and a set of one or more instances 72a–72n that extend the base class in the manner previously described. As illustrated in FIG. 5, the mechanism also includes at least one control code routine 74 that is inserted within the Java routine 76 of interest. When the code 74 is triggered, it calls the abstract class 70, which may then be extended by one of the class instances 72 to provide the notification 78.

One of ordinary skill in the art will appreciate that the above-described mechanism provides a convenient mechanism for security notification within the trusted computing installation. The abstract class comprises a generic framework for the security notification mechanism. A central authority or other author may extend that class with a set of one or more instances that identify the particular notification (e.g., SNMP alert, e-mail, data logger, screen message or the like) to be used. The control code positioned within the Java routine of interest invokes the abstract class, which is then instantiated with a particular user-defined or installation-defined instance to generate a given notification. The particular text of the notice may reside in the instance or within the actual control code itself. By using a generic framework (namely, the security notification manager abstract class), the central authority may create a library of class instances that may be selectively plugged into the framework as needed to provide the notification service. As noted above, in the alternative, the security notification manager abstract class may use a set of default actions instead of, or in addition to, the class instances to provide the notifications.

One of the technical advantages of the pluggable framework is the central authority may create a class instance that implements more than just a single rule. Thus, for example, a given class instance may provide for rules to be set that trigger at certain thresholds defined in the instance. As an example, a given class instance may include a set of rules including a first rule that sets severity higher for corrupted certificates and a second rule that set a lower severity for other, less-sensitive events. With the pluggable framework, any degree of complexity for a given class instance may be readily implemented and used to extend the base security notification manager class in the manner described above.

The present invention provides many technical advantages as compared to the prior art. In an enterprise environment, the needs of the many may outweigh the needs of the few, and authorities in the enterprise may wish to know about, and potentially intervene in, security/integrity decisions made by individual users. This invention allows authorities to be informed when security-sensitive decisions have been made by enabling insertion of alerts at various points in Java where security relevant decisions are being made. Various mechanisms can be used to send these alerts, such as SNMP, e-mail, online database logging, and the like. By implementing the invention as an abstract class, a central authority may customized the framework by customizing the types of events that trigger an alert, as well as the nature and type of alert itself.

In the prior art, the central authority would simply ignore the untrusted code event, as it was assumed to be the act of an individual in his or her own computing world. The invention acknowledges that the acts of a user of untrusted code may have implications for the whole enterprise and provides the mechanism to react to change, as appropriate.

Although the inventive notification mechanism and service have been described in the context of Java, this is not a limitation. The technique may be practiced whenever it is desired to enable a program written in code that is not part of a trusted computing base to interact with a security subsystem of a trusted computing installation.

One of the preferred implementations of the various routines described above is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific application environment, those skilled in the art will recognize that the invention can be practiced, with modification, in other and different hardware and operating system architectures with the spirit and scope of the appended claims.

Having thus described our invention, what we claim as new and desire to secure by Letters Patent is set forth in the following claims.

What is claimed is:

1. A method for notifying a central authority of changes to a trusted computing installation, comprising the steps of:
    determining that a user has made a security modification to a portion of the trusted computing installation under user control;
    determining that the security modification is a notification event if the security modification is a predetermined event indicative of an attempt to circumvent a security mechanism of the trusted computing installation; and
    sending the central authority a notification of the security modification, in response to determining that the security modification is a notification event.

2. The method as described in claim 1 wherein the predetermined event is chosen from the group consisting of a failed applet signature verification, an addition of a certificate in a certificate database and a modification of a certificate in a certificate database.

3. The method as described in claim 1 wherein the predetermined event is created by a Java applet wishing to run with higher privileges and further comprising the steps of:
    verifying a signature of the Java applet;
    responsive to a failed verification of the signature, running the applet as untrusted; and
    sending the central authority a notification of the failed verification.

4. The method as described in claim 1 wherein the central authority provides a mechanism wherein the group of predetermined events can be modified by an authorized user.

5. The method as described in claim 1 wherein the notification is chosen from the group consisting of an SNMP alert, an e-mail, a screen message and an online database.

6. The method as described in claim 1 wherein the security modification is to allow untrusted code to run in the trusted computing installation.

7. The method as described in claim 1 wherein the step of determining that the security modification is a notification event is accomplished by an abstract class instantiation which defines the type of notification in a concrete implementation of the abstract class instantiation.

8. The method as described in claim 1 wherein the trusted computing installation further comprises a Java Virtual Machine resident in a local machine under user control.

9. A method of notifying a central authority of changes to a trusted computing installation, comprising the steps of:
    determining that a user has made a security modification to a portion of the trusted computing installation under user control;
    invoking a security notification manager class;
    instantiating the security manager class with an instance that determines that the security modification is a notification event if the security modification is a predetermined event indicative of an attempt to circumvent a security mechanism of the trusted computing installation; and
    sending the central authority a notification of the security modification, in response to determining that the security modification is a notification event.

10. The method as described in claim 9 wherein the notification is selected from a group of notifications consisting of: an SNMP alert, an e-mail, a database log, and a screen message.

11. The method as described in claim 9 wherein the determining step executes a given control routine when the user has made a security modification to a portion of the trusted computing installation under user control.

12. The method as described in claim 11 wherein the portion of the trusted computing installation is an applet signature verification routine.

13. The method as described in claim 11 wherein the portion of the trusted computing installation is a certificate modification routine.

14. A method for notifying a central authority of changes to a trusted computing installation, comprising the steps of:

upon a given security modification, invoking a security notification manager class;

extending the security notification manager class with one of a set of instances, wherein a given instance determines that the security modification is a notification event if the security modification is a predetermined event indicative of an attempt to circumvent a security mechanism of the trusted computing installation; and sending the central authority a notification of the security modification, and response to determining that the security modification is a notification event.

15. A computer program product in a computer-useable medium for notifying an authority of changes to a trusted computing installation, comprising:

a security notification manager class;

at least one class instance for the security notification manager class for determining that a given security modification is a notification event if the security modification is a predetermined event indicative of an attempt to circumvent a security mechanism of the trusted computing installation; and means for sending the authority a notification of the given security modification in response to determining that the security modification is a notification event.

16. The computer program product as described in claim 15 wherein the notification is selected from a group of notifications consisting of: an SNMP alert, an e-mail, a database log, and a screen message.

17. The computer program product as described in claim 15 further including a control routine for determining when the user has made a security modification to a portion of the trusted computing installation to generate the given security modification.

18. A computer program product in a computer-readable medium for notifying an authority of changes to a trusted computing installation, comprising:

a control routine executed upon a given security modification in the trusted computing installation for invoking an abstract Java class;

at least one class instance for the abstract Java class for determining that the given security modification is a notification event if the security modification is a predetermined event indicative of an attempt to circumvent a security mechanism of the trusted computing installation; and means for sending the authority a notification of the given security modification in response to determining that the security modification is a notification event.

19. A trusted computing base, comprising:

untrusted code executing in the trusted computing base;

means operative as the untrusted code is executed for determining whether a given security modification has occurred, wherein the given security modification is a predetermined event indicative of an attempt to circumvent a security mechanism of the trusted computing base;

means responsive to the occurrence of the given security modification for invoking a security notification manager class that issues a given notification.

20. The trusted computing base as described in claim 19 further including a set of one or more security notification manager class instances, wherein a given security notification manager class instance extends the security notification manager class to identify a given security modification.

21. The trusted computing base as described in claim 20 wherein a given security manager class instance includes at least first and second rules, wherein the first rule triggers a first notification and the second rule triggers a second notification.

22. A notification service for a trusted computing installation, comprising:

a pluggable framework for receiving a set of notification objects, wherein each notification objects identifies a given notification that is issued upon a given security modification to the trusted computing installation, wherein the given security modification is a predetermined event indicative of an attempt to circumvent a security mechanism of the trusted computing base; and means for issuing the given notification upon the occurrence of its associated security modification.

23. The notification service as described in claim 22 wherein the given notification is selected from a group of notifications consisting of: an SNMP alert, an e-mail, a database log, and a screen message.

* * * * *